United States Patent [19]
Duhamel

[11] Patent Number: 4,797,847
[45] Date of Patent: Jan. 10, 1989

[54] DISCRETE COSINE TRANSFORMER

[76] Inventor: Pierre Duhamel, 97, avenue de Verdun, 92130 Issy les Moulineaux, France

[21] Appl. No.: 10,702

[22] Filed: Feb. 4, 1987

[30] Foreign Application Priority Data

Feb. 6, 1986 [FR] France .................. 86 01629

[51] Int. Cl.$^4$ .................................... G06F 15/332
[52] U.S. Cl. .................................... 364/725
[58] Field of Search .................... 364/725, 826

[56] References Cited

U.S. PATENT DOCUMENTS

| | | | |
|---|---|---|---|
| 3,920,974 | 11/1975 | Means | 364/725 |
| 4,152,772 | 5/1979 | Speiser et al. | 364/725 |
| 4,196,448 | 4/1980 | Whitehouse et al. | 364/725 |
| 4,385,363 | 5/1983 | Widergren et al. | 364/725 |
| 4,449,194 | 5/1984 | Wilhelm | 364/725 |
| 4,675,836 | 6/1987 | Arnould et al. | 364/725 |

OTHER PUBLICATIONS

Chen et al., "A Fast Computational Algorithm for the Discrete Cosine Transform" *IEEE Trans. on Communications*, vol. COM-25, No. 9, Sep. 1977, pp. 1004–1009.

Primary Examiner—David H. Malzahn
Attorney, Agent, or Firm—Larson & Taylor

[57] ABSTRACT

The device is applicable to data compression. It computes the discrete cosine transform X of a signal x represented by N digitized samples x, ... x, ... x, where N is a power of 2:

$$X_k = \sum_{i=0}^{N-1} x_i \cos[(2\pi/4N)(2i+1)k]$$

the device includes a convolver for convolution between the samples xi and a stored sequence of samples wi (N) and a set of identical elementary circuits grouped in serveral banks. Each circuit is a "butterfly" having two inputs and two outputs one of which delivers the sum and the other the difference of the two inputs. The elementary circuits of the first bank receive at their two inputs the samples of the convolution product whose indices are separated by N/2 from each other.

3 Claims, 2 Drawing Sheets

DISCRETE COSINE TRANSFORMER

BACKGROUND OF THE INVENTION

1. Field of the Invention

The invention relates to the processing of sampled digitilized signals for providing a discrete cosine transform (DCT).

2. Description of the Prior Art

For a long time fast discrete transforms have been used for the time or spatial compression of data to be transmitted or to be stored. Simple transforms have more especially been used, such as the Walsh-Hadamard transform which has the advantage of requiring only simple circuits but on the other hand only provides a low compression rate.

The need is now felt for fast transforms allowing high compression rates to be reached but however only requiring circuits of acceptable complexity and able to operate in real time.

The use has more particularly been proposed of the DCT, in particular for videotext systems, because it appreciably increases the compression rate. But, even for small length transforms, it is difficult to construct integrated circuits able to operate in real time at the sampling frequencies required, even when the latest algorithms proposed are used, which reduce the complexity of the calculation. In practice, sampling frequencies of 10 MHz can be barely reached for transforms of a length of eight.

A device is also known (document U.S. Pat. No. 4,385,363) for calculating the DCT of a signal. This device uses elementary circuits providing the sum and difference of two inputs. But the device has a pipelined construction with several stages each of which includes adders and multipliers. It implements the Chen and Fralick algorithm and this conception leads to complex architecture.

SUMMARY OF THE INVENTION

The invention aims at providing a sampled signal processing device capable of delivering the DCT of the signal, having a simpler architecture than that of known devices and implementing for this a new algorithm obtained by causing a partial equivalence to appear between DCT and cyclic convolution, requiring no more multiplications than the calculation of a cyclic convolution of the same length.

To this end, the invention provides a device for calculating the discrete cosine transform $X_k$ of a signal $x$ represented by N digital samples $x_0, \ldots x_i, \ldots x_{N-1}$, where N is a power of 2:

$$X_k = \sum_{i=0}^{N-1} x_i \cdot \cos[(2\pi/4N)(2i + 1)k] \qquad (1)$$

characterized in that it comprises convolving means for convolution between the samples $x_i$ and a stored sequence of samples $w_i$ (N) and further includes a set of identical elementary circuits grouped in several banks, each having two inputs and two outputs one of which delivers the sum and the other the difference of the two inputs, the elementary circuits of the first bank receiving at their inputs samples of the convolution product whose indices are separated by N/2 from each other.

In the following, capital letters will denote the transformed samples or sequences.

In a first embodiment, using conventional convolving means, for example a systolic convolver, the elementary circuits of the first bank will supply directly the uneven (odd) values $X_1, X_3, \ldots$ and the circuits of the following banks, by combination of said uneven values, the successive even values at the subtraction outputs.

In another embodiment, the cyclic convolving means is built by means of the number theoretic transforms (NTT) of the samples; in this case, the coefficients X of the transform appear naturally during the convolution calculation, even before the final result of this latter. It becomes useless to perform the reverse($NTT^{-1}$) transform completely, on most of the coefficients X.

The invention will be better understood from reading the following description of particular embodiments of the invention, given by way of non limitative examples.

SHORT DESCRIPTION OF THE DRAWINGS

DETAILED DESCRIPTION OF THE INVENTION

Figure 1:
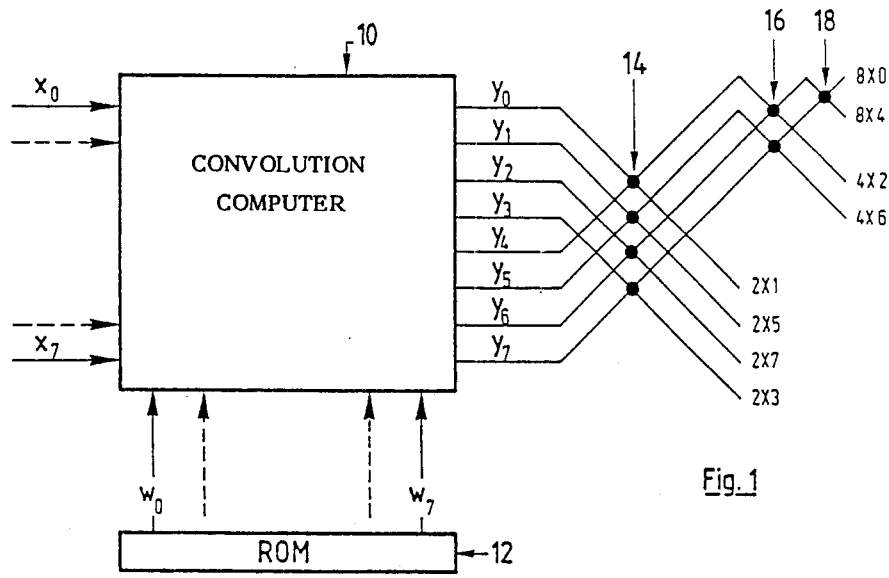
FIG. 1 is a general diagram showing the elements to be added to a cyclic convolving means, which may be of conventional construction, so a to form a device providing the cosine transform.

Before describing devices in accordance with the invention, it is necessary to give the mathematical approach showing the equivalence between DCT and cyclic convolution, which justifies the architecture of the devices.

By two successive variable changes we pass from the conventional expression of the DCT (formula 1 above) to a cyclic convolution of the form:

$$\sum_{i=0}^{N-1} x_i \cdot h_{n-i} \cdot \text{modulo } N \qquad (2)$$

The first variable change is intended to cause to appear, in the cosine term, the value $4i+1$ which is more readily generated than the value $2i+1$. It consists in substituting for x, in the formula (1) the variable x' such that:

$$x' = x_{2i}$$

$$x'_{N-i+1} = x_{2i+1} \text{ for } x'_0, \ldots, x'_{N/2-1}$$

This variable change distributes the values x' into two groups, one corresponding to the even values $x_{2i}$ of x, the other to the odd values to $x_{2i+1}$.

We then obtain:

$$X_k = \sum_{i=0}^{N-1} x'_i \cdot \cos[(2\pi/4N)(4i + 1)k] \qquad (3)$$

A second variable change will then cause the difference of two indices instead of a product to intervene in the definition of the transform. Thus we arrive at the conventional formulation (2) of the cyclic convolution, with its term $h_{n-i}$.

In order to obtain this result, use is made of the correspondance between the set of integers congruent to 1, modulo 4 and less than $2^{n+2}$, and the set of integers less than $2^n$. It is possible to write:

$$4i+1 = 5^u i \text{ modulo } 2^{n+2} \quad (4)$$

for $i = 0, 1, \ldots, 2$.

Subsequently, in order to facilitate writing of the equations, the following notation will be used:

$$4i+1 = <5^u i>_{2^{n+2}}$$

Formula (3) then becomes:

$$X_k = \sum_{i=0}^{N-1} x'_i \cdot \cos[(2\pi/4N)<5^u i>_{2^n} + 2k] \quad (5)$$

In this formula, the factor $x'_i$ may be written, while taking into account the equivalence indicated by formula (4):

$$x'_i = x' \frac{<5^{ui}>_{2^n} + 2 - 1}{4} \quad (6)$$

and by assuming:

$$x''_i = x' \frac{<5^i>_{4N} - 1}{4} \quad (6)$$

we find:

$$X_k = \sum_{i=0}^{N-1} x''_i \cdot \cos[(2\pi/4N)<5^i>_{4N} k] \quad (7)$$

To better show the equivalence between DCT and cyclic convolution, a polynomial notation will now be used introducing a mute or "dummy" variable z allowing X to be put in the form of a polynomial. Two polynomials U and V are defined comprising N terms, each term corresponding to a power of z between 0 and $N-1$:

$$U(z) = \sum_{i=0}^{N} x''_i \cdot z^i \quad (8)$$

$$V_k(z) = \sum_{i=0}^{N-1} \cos[(2\pi/4N)<5^i>_{4N} k]z^i \quad (9)$$

$X_k$ will then be the constant term of the polynomial product of $U(z^{-1})$ and of $V_k(z)$. In other words, X is the constant term (corresponding to Z) of the product:

$$U(z^{-1}) \cdot V_k(z) \text{ modulo } (z^N - 1) \quad (10)$$

It can be shown that all odd terms, that is to say of the form $V_{2k+1}(z)$, belong to the same family of polynomials offset with respect to each other by a power of z modulo $z^N - 1$. That follows from the preceding calculations for the expression (1) (when it is written for the odd values $k = 2k'+1$) is symmetrical in i and k.

If we know $V_1$, all the other uneven values $V_{2k+1}$ may then be deduced.

To facilitate the calculations, the following sequence will now be introduced:

$$w_i^{(N)} = 1 + \sum_{j=0}^{n-1} \cos[(2\pi/4N)<5^i>_{4N} 2^j] \quad (11)$$

where n is the same power of 2 as that determining the required length N and j is an incrementation index different from i.

This sequence $w_i$ may then be calculated once and for all and stored in a DCT computation device.

We will now see that the DCT may be obtained by cyclic convolution of the sequence $(x_i)$ of the samples of the signal with the sequence $(w_i)$ stored and a few extra additions.

For that, it is sufficient to remark that the polynomial W(z), whose w's are the coefficients of the successive powers of the mute variable z, is written:

$$W^{(N)}(z) = \sum_{i=0}^{N-1} w_i^{(N)} \cdot z_i = \quad (12)$$

$$V_0(z) + V_{20}(z) + V_{2l}(z) + \ldots + V_{2j}(z) + V_{2(n-1)}(z)$$

and all the $V_k$'s of z may be obtained by adding successive shifted versions of W(z), since:

$$2V_1(z) = W^{(N)}(z) - z^{N/2} \cdot W^{(N)}(z) \text{ modulo } (z^N - 1) \quad (13)$$

Now, it was mentioned above that all odd terms $V_{2k'+1}$ belong to the same family and are deduced from each other by shifting. All the odd terms $V_{2k'+1}$ are therefore deduced from $V_1(z)$ by shifting. Similarly, all the even terms $V_{2(2k'+1)}(z)$ are deduced from $V_2$ by shifting. In fact, the similarity may be noted between the expression $2V_1(z)$, given by the formula (13), and that of $2W^{(N/2)}(z)$:

$$2W^{(N/2)}(z) = W^{(N)}(z) + z^{N/2} \cdot W^{(N)}(z) \text{ modulo } (z^N - 1) \quad (14)$$

and we may then draw therefrom the terms congruent to 2 mod 4 of the cosine transform:

$$2V_2(z) = W^{(N/2)}(z) - z^{N/4} \cdot W^{(N/2)}(z) \quad (15)$$

and all the $V_{2(2k'+1)}(z)$s by successive shifts of V.

By iteration, we will thus obtain successively $V_{2k'+1}(z)$ $V_{2(2k'+1)}(z)$ $V_{2l(2k'+1)}(z)$ $V_{N/2}(z)$ $V_N(z) = V_0$ that is to say, for $N = 8$, successively:

$V_1, V_3, V_5, V_7$ $V_2, V_6$ $V_4$ $V_0$

Expressed in another form, $V_k(z)$ may be presented in the form:

$$V_k(z) = W^{(N)}(z) \sum_{l=0}^{M} z^l \text{modulo}(z^N - 1) \quad (16)$$

where $a_l$ is a "mute" variable.

The formula (16) shows that all the $V_k$s are formed by the sum of shifted versions, in the polynomial sense (that is to say derived from each other by multiplying by z).

It is sufficient to know the polynomial product $Y(z)$:

$$Y(z) = \sum_{l=0}^{N-1} y_l = U(z^{-1}) \cdot W^{(N)}(z) \text{modulo}(z^N - 1) \quad (17)$$

for finding $X_k$, a constant term (i.e. a factor corresponding to the zero power of z) of the product $U(z^{-1}) \cdot W(z)$ since, if we consider the formula (16):

$$U(z^{-1}) \cdot V_k(z) = U(z^{-1}) \cdot W(z) \sum_{l=0}^{M} z \text{modulo}(z^N - 1)$$

and according to (17):

$$= Y(z) \sum_{l=0}^{M} z \text{modulo}(z^N - 1) \quad (18)$$

Now, the polynomial product $U(z^{-1}) \cdot W(z)$ is another way of writing the cyclic convolution of $u_i$ by $$\{w_{-l}\} = y_n = \sum^{N-1} x_l \cdot w_l - nN \quad (19)$$

which may be compared to the conventional formula (2) of the cyclic convolution.

To sum up, it can be seen that the DCT may be obtained by carrying out in sequence:
 a conventional cyclic convolution operation on the input samples x and the values w which may be calculated and stored once and for all, for each value of N;
 the operations represented by equations (15) and (16) which are limited to additions and may be represented in the form of "butterflies" used for FFTs, a and b being the inputs:

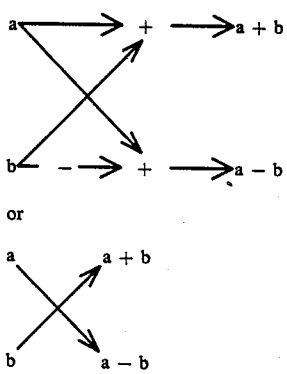

FIG. 1 shows, by way of example, a possible construction of a DCT device using a cyclic convolver which may have any of the known conventional constructions. It may more particularly be a cyclic convolver of systolic type such as the one described in the article by H. Barral et al "Circuits for Digital Signal Processing", Proceedings of ICASSP 84, paper No. 44-9, completed with connections to make it cyclic. The convolver 10 shown is provided so as to perform a cosine transform of length N=8. It comprises eight inputs intended to receive the samples $x_0, \ldots x_7$ and eight inputs $w_0, \ldots w_7$ intended to receive the values w, stored in an ROM 12. The output values $y_0, \ldots y_7$ delivered by the convolver are those given by the above formula (19). These values must be combined by operators which only carry addition or subtraction operations. A first bank of "butterfly" type operators 14, corresponding to the above algorithm (13), delivers directly the double of the values of $X_1$, $X_5$, $X_7$, and $X_3$ (odd terms). A second bank, 16, formed of two operators identical to the four operators 14, delivers, from the addition outputs of operators 14, the quadruple of the value of $X_2$ and of $X_6$. Finally, a last operator 18 delivers the octuple of the value of $X_0$ and of $X_4$.

The existence of an equivalence between DCT and cyclic convolution allows the multiplicative complexity of DCTs of any length $2^n$ to be calculated, that is to say the minimum number of multiplications required for calculating a DCT of length $2^n$. Since the passage from the convolution to the DCT does not require multiplication, the DCT and the convolution have the same multiplicative complexity:

$$\mu(\text{conv. } 2^n) = 2^{n+1} - n - 1$$

Furthermore, it should be noted that one of the multiplications is trivial, that is to say consists of a multiplication by a factor belonging to the set of rational integers. Consequently:

$$\mu(\text{DCT } 2^n) = 2^{n+1} - n - 2.$$

In the example chosen above of a length $N=8=2^3$, it will be necessary to carry out $2^4 - 3 - 2 = 11$ multiplications.

The present current technologies allow a multiplication to be carried out at a rate of 10 MHz. If we desire to provide the same rate in circuits for complying for example with the requirements of photovideotext systems, it will be necessary to implement in the circuit at least two multiplications, and often more because of the lack of regularity of the products.

For 12 bit input words, with a single complete convolver of the above described kind, a speed may be reached of about 300 KHz.

Figure 2:
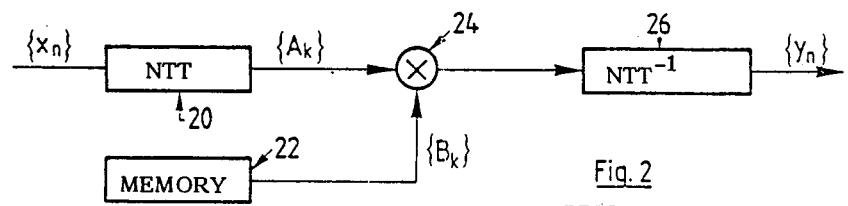
FIG. 2 is a diagram showing the usual implementation of a convolving means from the NTTs of the signal samples and of the generated or stored sequence.

In the modified embodiment shown in FIG. 2, the device uses a number theoretic transformer 20. The values $(x_n)$ are applied to the input of a number theoretic transformer or NTT which delivers a sequence $(A_k)$:

$$A_k = \sum_{n=0}^{N-1} a^{nk} \cdot x_n \text{modulo } M$$

where $a$ is an nth positive radix of the unit modulo M.

The device also includes a memory 22 in which are stored the number theoretic transform $(B_k)$ of the sequence $(w_n)$ of value w. The values B are calculated once and for all by the formula $$B_k = \sum_{n=0}^{N-1} a^{nk} \cdot w_n \text{modulo } M$$

The number theoretic transforms are applied to a modulo M multiplier 24 which delivers the number theoretic transform of the result sequence $(y_n)$ which is obtained by means of a reverse number theoretic transform or $(NTT^{-1})$26.

By suitably choosing N and M, we may have a simple value of $\alpha$. A value of $\alpha$ may more particularly be taken equal to a power of 2. In this case, the NTT and $NTT^{-1}$ transformers do not comprise any multiplication, but only shifts which simplifies the implementation of the circuit.

In addition, the use of number theoretic transformers provides an additional simplification if we consider that the reductions of $y(z) = \Sigma y_n \cdot z^n$ modulo (the cyclotomic polynomials) intervene as intermediate variables inside the NTT algorithms. The calculation of $NTT^{-1}$ occurring in FIG. 2 may be interrupted before its end.

Figure 3:
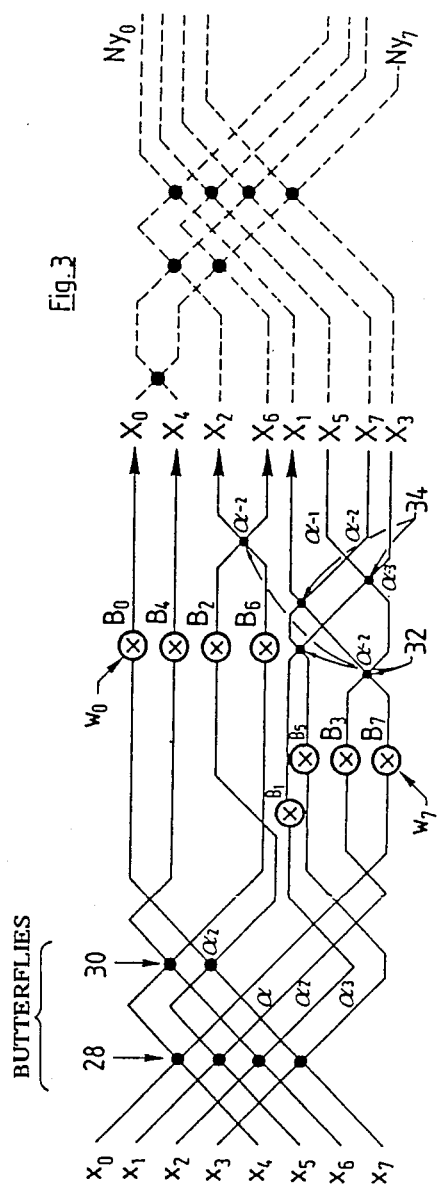
FIG. 3 shows schematically the simplifications intervening in the $NTT^{-1}$ for obtaining the DCT of the samples of a signal before complete calculation of the convolution.

FIG. 3 is a graph of a cosine transform computing device which uses the simplified algorithm, for a length N=8. On the graph are shown the groups of butterfly operators 28, 30, 32 and 34 having the same construction as those used in FIG. 1. However, the operators of FIG. 1 are current operators whereas those of FIG. 3 deliver the modulo M result and may be of the kind described in the European application No. 0 175 623 (Duhamel et al). The multipliers $B_0$ to $B_7$ receive, on the one hand, the sequence of values delivered by the transformers 28 and 30 from values $x_0, \ldots x_7$ and, on the other hand, the values $B_0, \ldots B_7$ (i.e. the NTT of the corresponding values w). These values $B, \ldots B$ may be supplied by an ROM or be determined by the multipliers themselves, from the values w.

The transformer of FIG. 3 has the advantage of only requiring one general multiplication (modulo M) per point. Consequently, the circuits may be formed so as to operate at a sampling rate equal to the timing rate of the multiplier which may be of 10 MHz with the technologies available at the present time. By using particular multiplier diagrams such as the one shown in FIG. 11 of European application No. 0 175 623 and in the corresponding U.S. Pat. Ser. No. 778,963 (Duhamel et al), the rate may be further increased.

Devices may be formed similar to that of FIG. 3, but corresponding to other values of N. It is particularly interesting, in all cases, to adopt particular values of M which result in a simplication of the architecture. This is particularly the case when a Fermat number $2^{2q}+1$, a pseudo Fermat number $2^{2q}+1$, or a number of the type $M=2^{2q}-2^q+1$ is adopted for M. For example, for a number of the latter type with q=12, $\alpha=2^9$, any multiplication by a power of $\alpha$ is formed solely by rotations, complementations and, possibly, an addition.

In a modified embodiment of the invention, the number theoretic transformation is performed using a base change and encoding of the type described in European Pat. No. 0 175 623. In this case, the general diagram of the DCT may be limited to that shown in FIG. 4.

Figure 4:
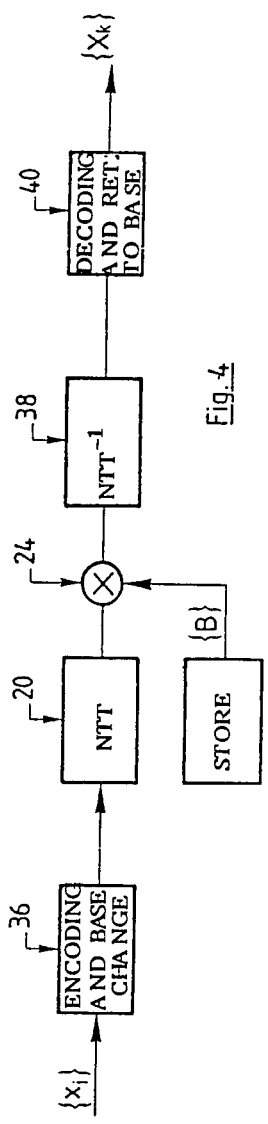
FIG. 4, similar to FIG. 2, shows a variant illustrating the "encoding" and "base change" blocks possibly required for simplifying the modulo arithmetic intervening in the NTT.

The device of FIG. 4 includes, upstream of the number theoretic transformer 20, a coding and base change circuit 36. The sequence {B} applied to multiplier 24 is also obtained by encoding, base change and NTT. The output sequence of multiplier 24 has not been subjected to the whole of the reverse NTT, since the reductions of Y(z) intervene as intermediate variables. The calculation is stopped at this stage, which simplifies the $NTT^{-1}$ transformer 38. The results obtained are subjected to a shift and return to the initial base in a circuit 40, which delivers the sequence $(X_k)$.

The components 20, 24 and 38 of FIG. 4 may then be formed by the circuit shown with a continuous line in FIG. 3, which should normally be completed by the broken line components. The inputs $x_i$ are applied to this circuit after encoding at 36 and the coded values $Ny_i$ would be obtained at the output; this broken line part is not required and it is the $X_i$ values which are applied to decoder 40.

The whole of the circuit shown in FIG. 3 (including the broken line part) may form a convolver 10 usable in the device of FIG. 1.

The convolver constructions mentioned above are not the only ones possible. A convolver may in particular be used having circuits using distributed arithmetic such as that described in "Digitial Filter Structures Described by Distributed Arithmetic", C. Sydney Burrus, IEEE Transactions on Circuits and Systems, cas. 24, No. 12, December 77, pp. 674–680 and in "A Prime Factor FTT Algorithm using Distributed Arithmetic" by Shuni Chu et al, IEEE Transactions on Acoustics, Speech and Signal processing Vol. ASSP-30, no. 2, April 82, pp 217–226.

I claim:

1. A device for computing the discrete cosine transform $X_k$ of a signal x represented by N digitized samples $x_0, \ldots, x_i \ldots x_{N-1}$, where N is a power of 2:

$$X_k = \sum_{i=0}^{N-1} x_i \cos[(2\pi/4N)(2i+1)k]$$

comprising:
  means for storing a predetermined sequence of samples $w_i(N)$;
  convolving means connected to receive said N digitized samples $x_i$, and said predetermined sequence of samples $w_i(N)$ and arranged to carry out a convolution between the samples $x_i$ and said stored sequence of samples $w_i(N)$ and to provide N convolution products having indices i from 0 to N−1; and
  a set of identical elementary circuits distributed into a plurality of serially connected banks, each circuit having two inputs and two outputs one of which delivers the sum and the other the difference of the two inputs, each of the elementary circuits of the first bank being connected to receive, on its two inputs, samples of the convolution products whose indices are separated by N/2 from each other.

2. A device as claimed in claim 1, wherein the elementary circuits of the first bank are connected to deliver the odd values $(X_1, X_3, \ldots)$ of said discrete cosine transform on their outputs and the circuits of the following bank are connected to combine said odd values, to provide successive even values $(X_0, \ldots X_8)$ of the transform at their subtraction outputs.

3. A device for computing the discrete cosine transform $X_k$ of a signal x represented by N digital samples $x_0, \ldots, x_i, \ldots, x_{N-1}$, where N is a power of 2:

$$X_k = \sum_{i=0}^{N-1} x_i \cos[(2\pi/4N)(2i+1)k]$$

comprising:

means for subjecting said samples $x_i$ to a NTT and delivering a sequence $A_k$:

$$A_k = \sum_{n=0}^{N-1} \alpha^{nk} \cdot x_n \text{ modulo } M$$

being a constant value, means for storing a predetermined sequence $B_k$ representing the number theroretic transforms of a predetermined sequence of N values, using said constant $\alpha$;

means for forming the modulo M product between the N terms of sequence $A_k$ and the N respective terms of the sequence $B_k$ as samples having indices $0, \ldots, N-1$; and a set of identical elementary circuits distributed into a plurality of serially connected banks, each circuit having two inputs and two outputs, one of which delivers the sum and the other the difference of the two inputs, wherein each of the elementary circuits of the first bank is connected to receive on its two inputs two samples of the modulo M product whose indices are mutually separated by N/2, namely 1 and (N/2)+1; ...; (N/2)−1 and N−1, and the outputs of indices 0 and N/2 of the means for forming the modulo M product directly deliver the values $X_0$ and $X_{N/2}$ of the discrete cosine transform.

* * * * *